(12) United States Patent
Goad

(10) Patent No.: US 8,342,771 B2
(45) Date of Patent: *Jan. 1, 2013

(54) REINFORCED SUPPORTING CONNECTORS FOR TUBULAR GRAB RAILINGS

(76) Inventor: Eugine W. Goad, Ely, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/163,983

(22) Filed: Jun. 20, 2011

(65) Prior Publication Data

US 2011/0248134 A1  Oct. 13, 2011

Related U.S. Application Data

(63) Continuation-in-part of application No. 11/251,990, filed on Oct. 17, 2005, now Pat. No. 7,967,522.

(51) Int. Cl.
- *F16B 7/00* (2006.01)
- *F16B 12/36* (2006.01)
- *F16B 13/00* (2006.01)

(52) U.S. Cl. .......................... 403/292; 403/205; 211/123

(58) Field of Classification Search ................ 403/2, 64, 403/119, 169, 170, 171, 174, 176, 178, 205, 403/223, 286, 291, 292, 294, 295, 298, 306; 256/51, 60, 65.01, 65.16, 67; 248/251; 211/105.1, 211/105.2, 123, 182

See application file for complete search history.

(56) References Cited

U.S. PATENT DOCUMENTS

| | | | |
|---|---|---|---|
| 674,752 A * | 5/1901 | Baker | .............................. 403/52 |
| 1,975,244 A | 10/1934 | Wiseman | |
| 2,147,879 A | 2/1939 | Burmeister | |
| 2,193,306 A | 2/1940 | Tinnerman | |
| 2,507,881 A | 5/1950 | Bennett | |
| 2,773,671 A | 12/1956 | Leibensperger | |
| 2,839,320 A | 6/1958 | Hill | |

(Continued)

FOREIGN PATENT DOCUMENTS

DE 3319330 11/1984

OTHER PUBLICATIONS

Disability Products Inc. Grab Bars, Nov. 11, 2000, 3 Pages, pp. 1-3 Pub. Disability Products, Inc.

(Continued)

*Primary Examiner* — Michael P Ferguson
*Assistant Examiner* — Nahid Amiri
(74) *Attorney, Agent, or Firm* — Nikolai & Mersereau, P.A.; James V. Harmon

(57) ABSTRACT

A reinforced connector assembly for a tubular grab railing has an upper tubing support that is aligned with the grab railing during use and a lower base portion bolted directly to the tubing support fastened to a wall or floor. The tubing support has an opening that divides it into upper and lower halves with a reinforcing plate hidden between them to form a three layer sandwich structure with at least one boss confined during use within the tubing. The connector assembly is a composite formed from an outer plastic resinous connector element and the hidden reinforcing plate which can be formed from steel. The reinforcing plate which provides reinforcement for the plastic components can include exposed ears on each side that frictionally engage and distend the tubing to prevent it from rotating during use. An adjustable connector assembly has two pivotally related portions to permit angular adjustment on site. A corner elbow, an end connector and an end extension are provided.

22 Claims, 9 Drawing Sheets

U.S. PATENT DOCUMENTS

| Patent | Kind | Date | Name | Ref |
|---|---|---|---|---|
| 3,000,656 | A | 9/1961 | Hollaender | |
| 3,233,871 | A | 2/1966 | Schroer | |
| 3,342,511 | A | 9/1967 | Galloway | |
| 3,386,590 | A | 6/1968 | Gretz | |
| 3,405,915 | A | 10/1968 | Blum et al. | |
| 3,489,392 | A | 1/1970 | Thom | |
| 3,568,220 | A | 3/1971 | Dees | |
| 3,906,983 | A * | 9/1975 | Parkison | 137/467 |
| 4,283,152 | A | 8/1981 | Smith et al. | |
| 4,398,840 | A | 8/1983 | French | |
| 4,603,904 | A | 8/1986 | Tolleson | |
| 4,647,241 | A | 3/1987 | Weber | |
| 4,691,818 | A | 9/1987 | Weber | |
| 4,706,367 | A | 11/1987 | Garringer | |
| 4,725,027 | A | 2/1988 | Bekanich | |
| 4,864,795 | A | 9/1989 | Burg | |
| 5,050,252 | A | 9/1991 | Cuttriss | |
| 5,098,216 | A | 3/1992 | Caperton | |
| 5,421,666 | A | 6/1995 | Spears | |
| 5,429,417 | A | 7/1995 | Kim | |
| D381,745 | S | 7/1997 | Owens | |
| 5,690,237 | A | 11/1997 | Marzec | |
| 5,803,647 | A | 9/1998 | Hughes | |
| 5,890,763 | A | 4/1999 | Asbjornsen | |
| 5,908,260 | A | 6/1999 | Watson et al. | |
| 6,095,713 | A | 8/2000 | Doyle et al. | |
| 6,430,759 | B1 | 8/2002 | Beltran | |
| 6,634,823 | B2 | 10/2003 | Sciortino | |
| 6,663,312 | B2 | 12/2003 | Cary et al. | |
| 6,672,552 | B1 | 1/2004 | Jao | |
| D492,530 | S | 7/2004 | Chen | |
| 6,817,044 | B1 | 11/2004 | Ouyoung | |
| D503,061 | S | 3/2005 | Fuchs | |
| 6,938,868 | B2 * | 9/2005 | Pence | 248/354.3 |
| 6,942,190 | B1 | 9/2005 | Lu | |
| 7,044,450 | B2 | 5/2006 | Striebel et al. | |
| 2004/0101354 | A1 | 5/2004 | Nakahori | |

OTHER PUBLICATIONS

C. D. Sparling Co. Modular Grab Bars, 2 Pages, pp. 1&2 Pub., 2000, The C. D. Sparling Co., Plymouth, MN (date unknown).

* cited by examiner

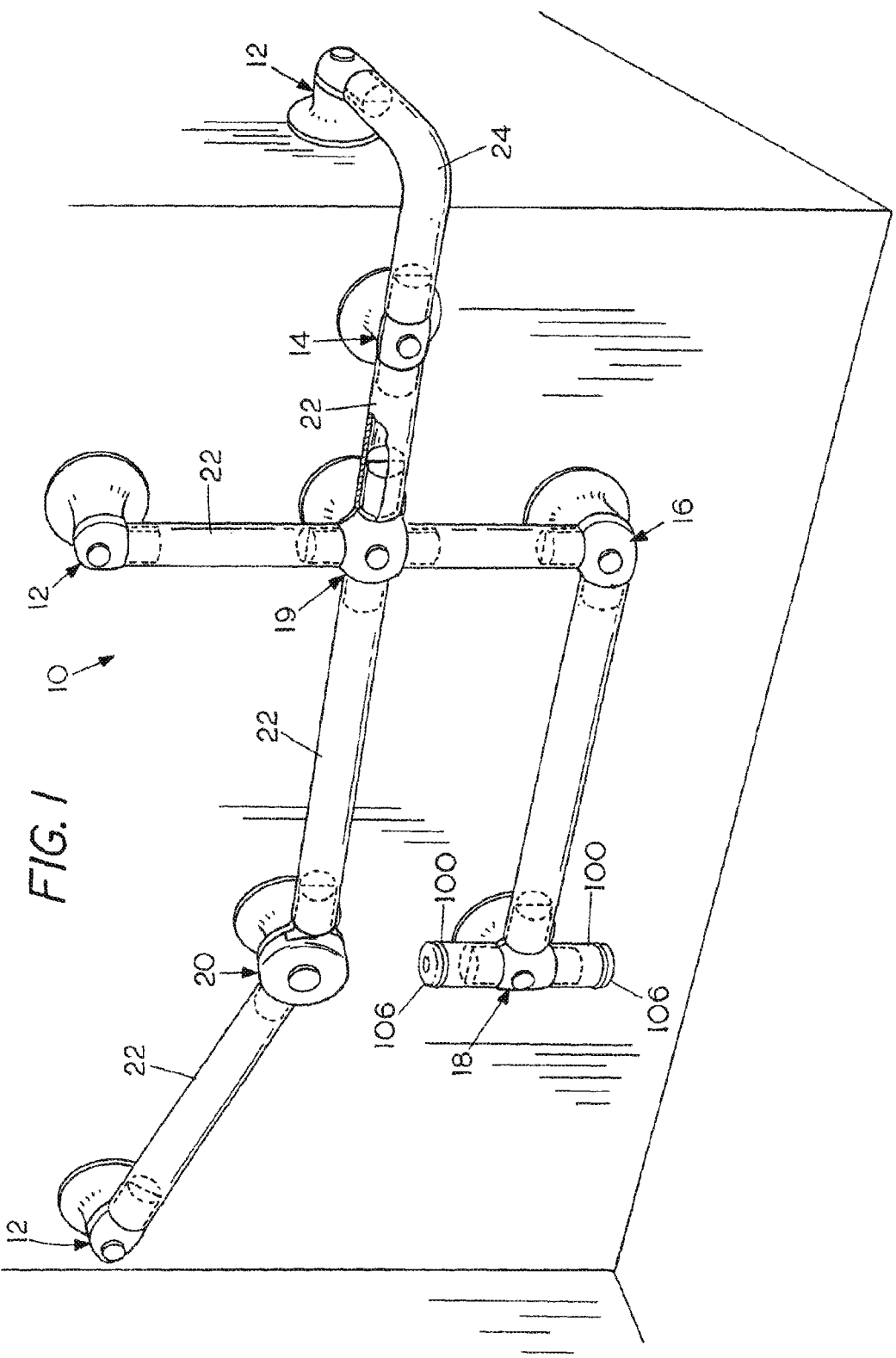

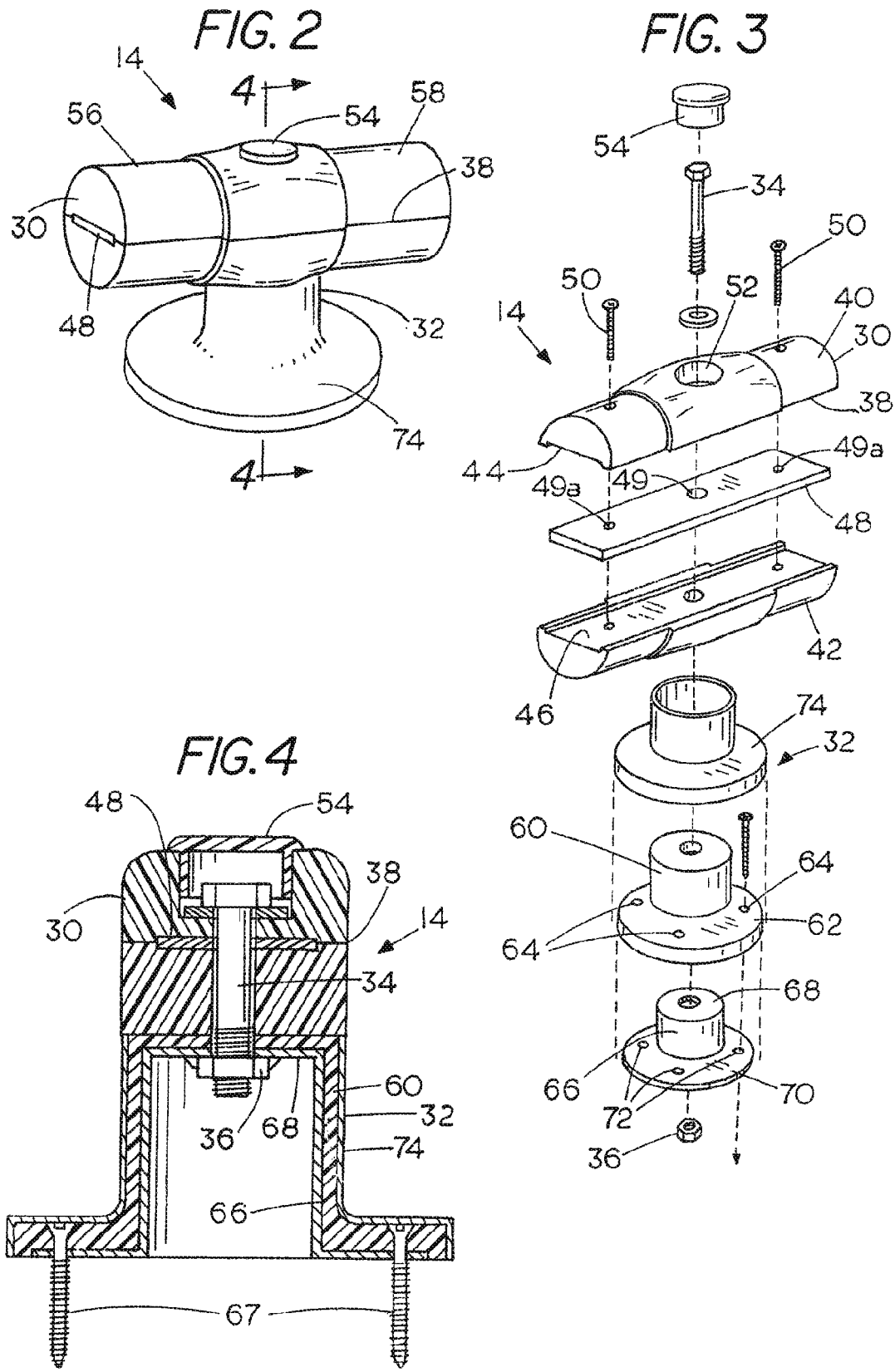

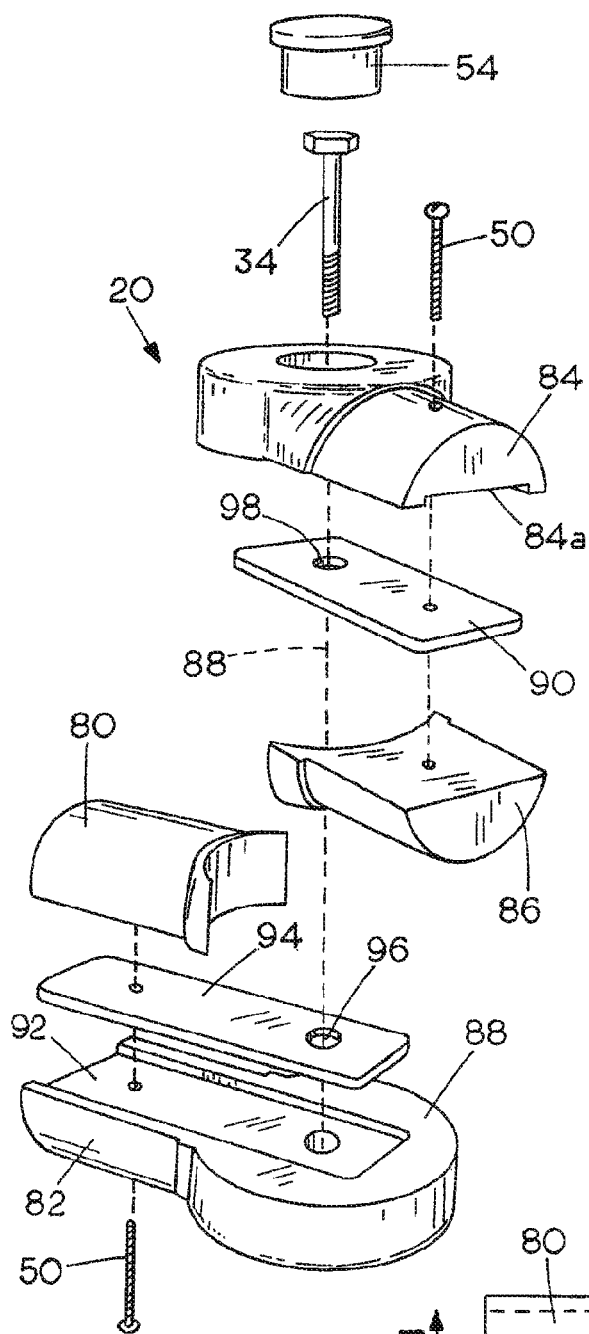
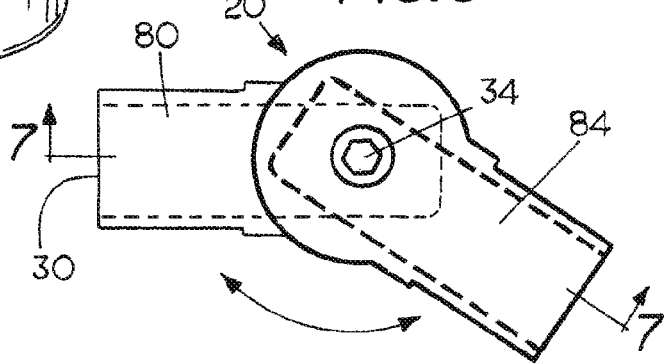

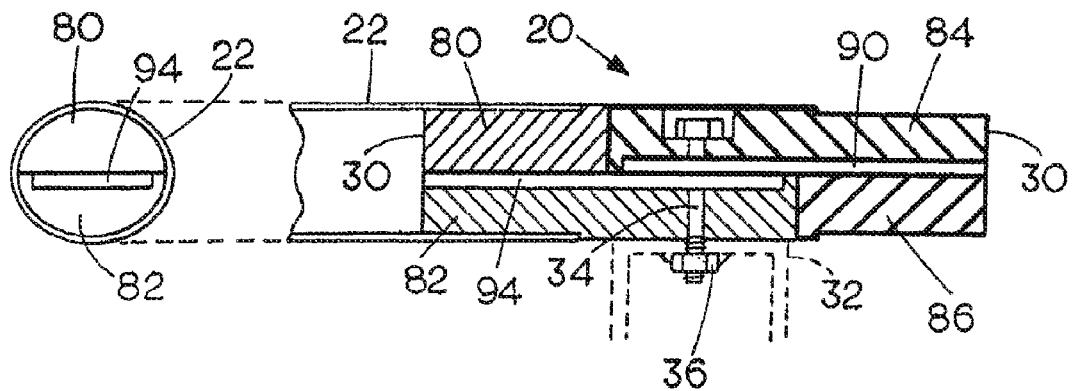
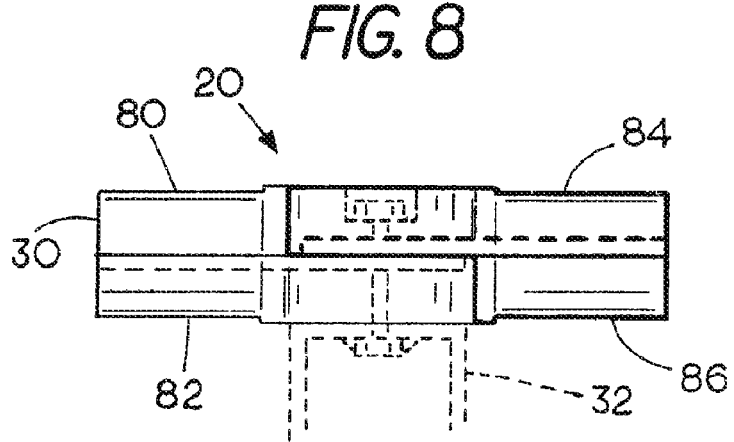
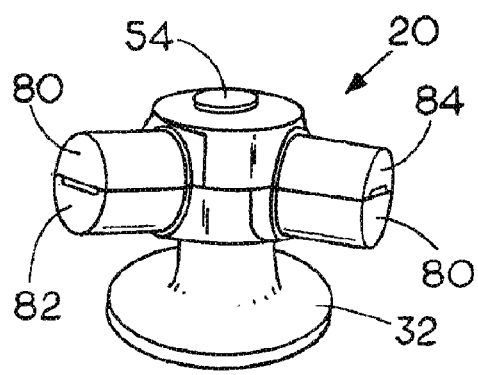

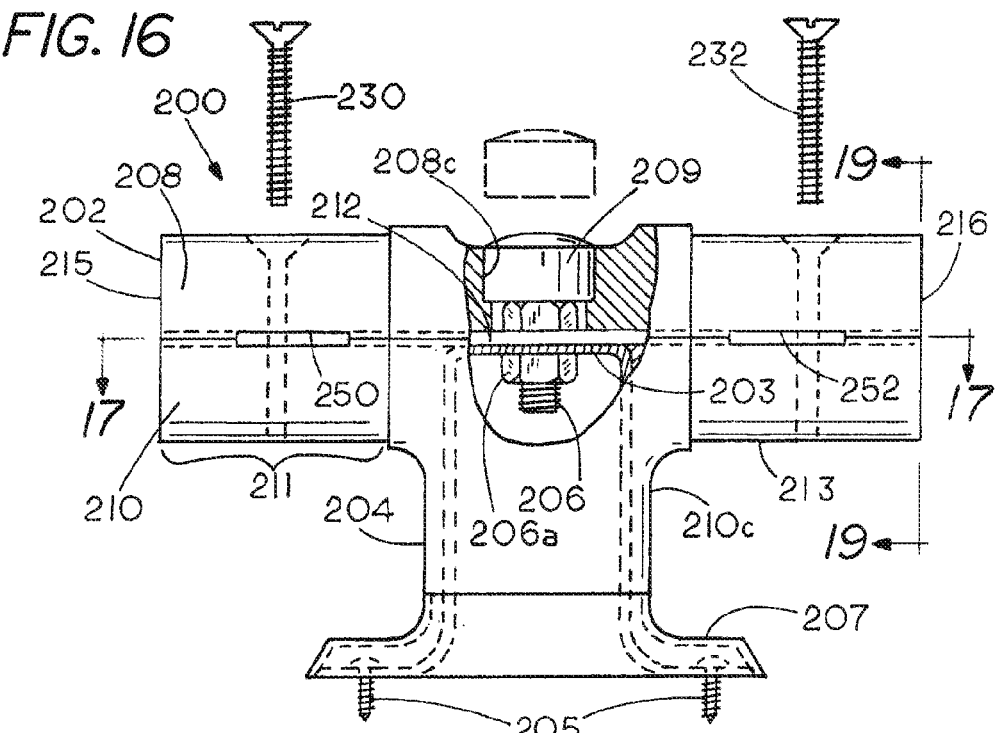
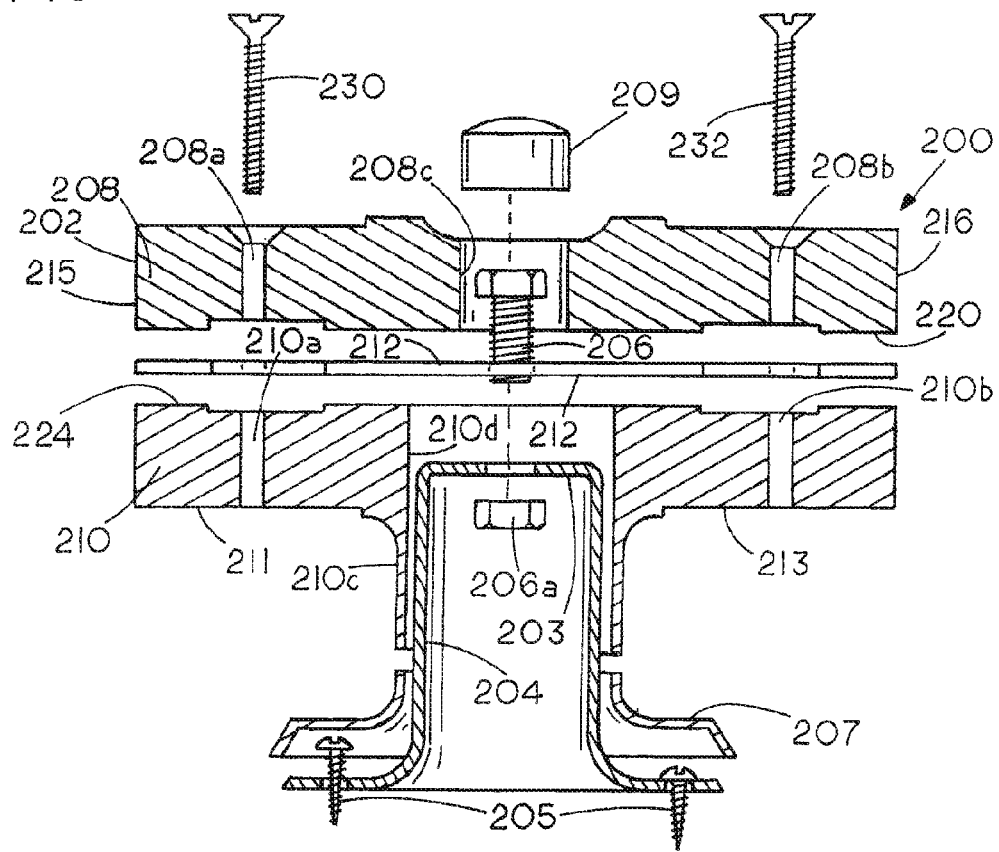

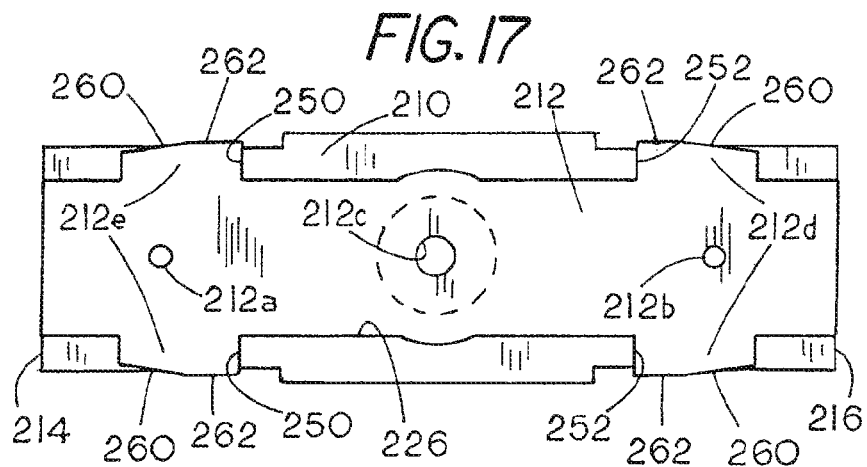
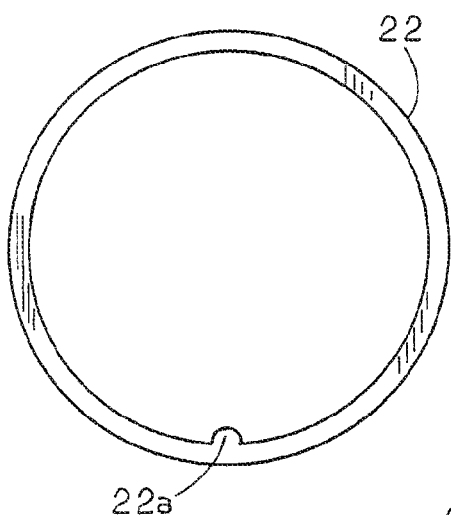
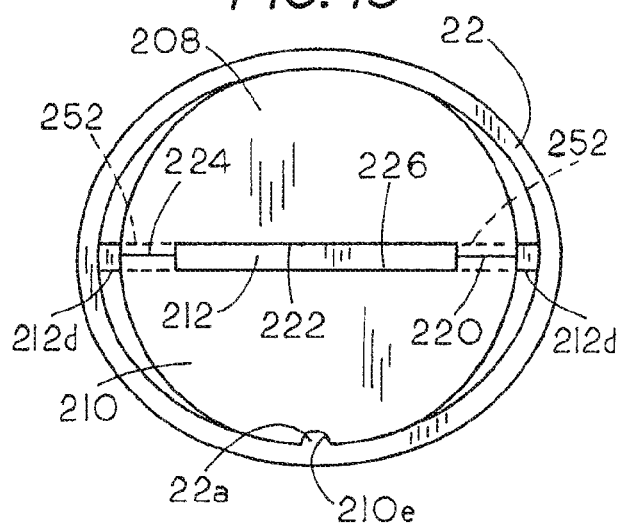

REINFORCED SUPPORTING CONNECTORS FOR TUBULAR GRAB RAILINGS

CROSS REFERENCE TO RELATED APPLICATIONS

This application is a continuation-in-part of complete application Ser. No. 11/251,990, filed Oct. 17, 2005, entitled "Reinforced Supporting Connectors for Tubular Grab Railings" (U.S. Pat. No. 7,967,522) and incorporated herein by reference in its entirety.

FIELD OF THE INVENTION

This invention relates to railings and more particularly to safety railings that are commonly referred to as grab bars and to connectors therefor.

BACKGROUND OF THE INVENTION

Because of safety concerns, particularly in bathrooms and showers which may have wet floors that make it possible for a person to fall, and concern for physically impaired individuals, it has become common to provide safety railings often called grab bars in bathrooms and around showers and bathtubs. Grab bars are particularly helpful and are frequently required by building codes to aid physically impaired individuals. Applicable building codes include stringent strength requirements. Consequently, grab bar systems now in use are formed from metal such as stainless steel or aluminum in order to have the strength needed to meet code requirements and accordingly are relatively expensive and have decorative and aesthetic limitations. While plastic grab bars have been previously proposed, e.g., formed from a plastic polymer as described, for example, in U.S. Pat. No. 5,690,237, it is difficult or impossible for plastic to meet the strength requirements set by building codes and they weaken with age. In addition, the patented device is not suited for use with commercially available tubing. Another problem is the difficulty associated with drilling holes and inserting grab bar mounting screws through a mounting flange often in a location that is beneath or behind the horizontally extending portions of the grab bar support unit. Thus, when a workman attempts to mount a grab bar support unit, he must drill holes and mount screws that are beneath or almost beneath the horizontal part of the grab bar support. This is time consuming, labor intensive, and often results in screws that are cocked to one side.

In view of these and other deficiencies of the prior art, it is one object of the present invention to provide a grab bar mounting assembly that exhibits outstanding performance, is easy to install, is rugged in construction and provides the appealing visual qualities of plastic, yet has the strength of steel so as to meet or exceed building codes, regulatory agency, and industry requirements.

Another object of the invention is to provide improved grab railing mounting hardware that can be readily manufactured from injection molded, thermo-formed or thermo-set plastic resin in any color and yet has the strength of steel.

A further object is to provide an improved mounting assembly for tubular grab railings of modular construction with interchangeable parts that can be readily assembled on site to meet dimensional and design requirements of any particular installation job.

Still another object is to provide a mounting system for tubular grab railings that has a more appealing appearance and better decorative possibilities than grab railings now in commercial use.

Another object is to provide a mounting connector assembly for tubular grab railings that will work with various kinds of commercially available metal or plastic tubing.

Another object is to remove stress on plastic parts and find a way to eliminate the possibility of catastrophic failure due to fracture or cracking of plastic components caused by aging, over-tightening screws or other causes.

Yet another object is to effectively prevent rotation of the tubing sections that extend between the connector assemblies so that the user will have secure support while at the same time facilitating rapid assembly during installation.

A further object is to make a connector assembly easier to clean as well as having a more attractive, yet less expensive cover for the base.

These and other more detailed and specific objects of the present invention will be better understood by reference to the following Figures and detailed description which illustrate by way of example but a few of the various forms of the invention within the scope of the appended claims.

BRIEF DESCRIPTION OF THE DRAWINGS

The present invention will be described below with reference to the accompanying drawings wherein the same numerals represent like structures in the several Figures and wherein:

FIG. 1 is perspective view of a grab railing mounted for use on the walls of a building by way of example to show several tubing connectors embodying the invention for supporting different numbers of tubes.

FIG. 2 is a perspective view of a straight connector 14 of FIG. 1 shown on a larger scale.

FIG. 3 is an exploded view of the connector of FIG. 2.

FIG. 4 is a vertical sectional view taken on line 4-4 of FIG. 2.

FIG. 5 is an exploded view of an adjustable connector 20 of FIG. 1 in accordance with the invention on a larger scale.

FIG. 6 is a plan view of the adjustable connector of FIG. 5 when assembled.

FIG. 7 is a vertical cross-sectional view taken on line 7-7 of FIG. 6.

FIG. 7A is a left end view of the connector of FIG. 7.

FIG. 8 is a side elevational view of the connector of FIGS. 5-7.

FIG. 9 is a perspective view of the adjustable connector 20 of FIGS. 5-8 on a slightly smaller scale.

FIG. 16 is a side elevational view partly in section of another form of reinforced connector assembly in accordance with the application, FIG. 16A is an exploded vertical sectional view of the connector assembly of FIG. 16, FIG. 17 is a transverse sectional view taken on line 17-17 of FIG. 16, FIG. 18 is an end view of a section of steel tubing to be placed between the connector assembly components as it appears before being installed on the connector assembly, FIG. 19 is an end view of the tubing support of the connector assembly taken on line 19-19 of FIG. 16 with a section of the tubing of FIG. 18 installed over a boss at one end of the connector assembly showing the lateral deflection of the sidewalls of the tubing.

SUMMARY OF THE INVENTION

Figure 10:
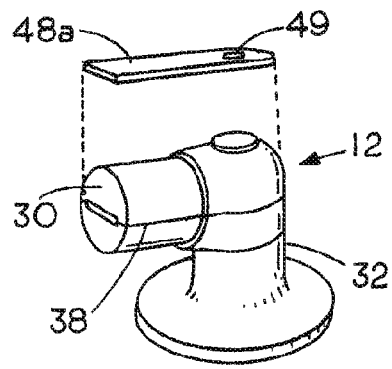
FIG. 10 is a perspective view of an end fitting connector 12 of FIG. 1 showing its reinforcing plate in exploded position.

Briefly, the present invention provides a reinforced supporting connector and a tubular grab railing. The connector comprises an upper tubing support or fitting that is aligned with the grab railing during use and a lower mounting base portion that is attached to the tubing support and is fastened a wall, floor, or other surface as a pedestal for the tubing support. The tubing support can be split or otherwise provided with an opening extending longitudinally which contains a reinforcing member extending longitudinally of the tubing support. The tubing support has at least one boss that is constructed and arranged to engage and support one end of a section of the grab railing tubing. The invention thus provides a composite connector assembly for supporting a section of grab railing; the composite connector being formed from dissimilar structural materials comprising an outer plastic resinous supporting element that is exposed to view and tactile contact by the user and a hidden typically metal reinforcing member which is recessed therein. Each boss is constructed and arranged to engage one end of a section of the tubular grab railing. The reinforcing member can be a metal plate that extends through the support to provide reinforcement for the tubing support including the boss as well as the tubing itself and can have exposed ears on each side that frictionally engage and distend the tubing to prevent it from rotating during use. A supporting base is attached to the tubing support to fasten the connector to a wall, floor, or other surface. The metal plate is held in direct contact with the base. The invention also provides an adjustable connector including two pivotally related portions with a joint between them to permit adjustment on site for establishing the desired angle of intersection between two adjoining grab bar railing sections and a section of elbow tubing with a right angle bend that can be used for inside or outside railing corners as well as end extensions, and a screw cover.

DETAILED DESCRIPTION OF THE PREFERRED EMBODIMENTS

With reference to the Figures and particularly FIG. 1, a tubular grab railing and supporting connectors in accordance with the invention is indicated generally by the numeral 10. The supporting connectors, all of which embody the invention, must, as in any railing system, support different members of railing sections at various angles and accordingly are provided with different numbers of tubing support members. FIG. 1 shows by way of example, connectors embodying the invention can be used with different numbers of tubes and include the following: three end connectors designated 12, one straight connector 14, one L connector 16, one T connector 18, one X connector 19, and one adjustable connector 20. Mounted between the connectors 12-20 are sections of commercially available metal or plastic tubing 22 which may be pre-cut or cut to length by workmen on site during installation. A section of tubing 24 having a right angle bend that can be used as an inside or outside elbow is shown at the right in FIG. 1 in a position mounted between the connectors 12 and 14. Tubing 22 can also be metal having a plastic outer sheath or a coating of paint.

The straight connector 14 will now be described in more detail by reference to FIGS. 2-4. The connector 14 includes an upper split connector assembly portion 30 and a lower upright mounting base portion 32 that is connected to the upper portion by a suitable fastener such as a bolt, pin, screw, rivet, or the like, all for convenience referred to herein simply as a fastener. In this case, the fastener is a bolt 34 that is attached to the base 32 by a nut 36 which is welded to the metal reinforcing base. The upper tubing support 30 is split longitudinally along a separation line 38 into upper and lower halves 40 and 42 with cooperating recesses 44 and 46 confronting one another that are of the appropriate size to receive a metal reinforcing plate 48 which is bored or has a punched opening 49 at the center and at each end at 49a for the bolt 34 and for screws 50 respectively which join the upper and lower halves of the tubing support 30. Plate 48 can be flat as shown or, if desired, can be corrugated or embossed. The central opening 49 for the bolt 34 is larger than the peripheral openings 49a for the screws 50. The reinforcing plate 48 is preferably a metal stamping formed from steel which extends through a pair of bosses 56 and 58 from one end of the upper portion 30 to the other. It can be seen that the fastener 34 secures the halves 40 and 42 together and at the same time fastens the upper portion 30 rotatably to the base 32. A socket 52 is provided in the top half 40 for the bolt 34 which following assembly is covered with a security cap 54 that is non-removable or only removable with a special tool (not shown). The tubing support 30 is elongated laterally and in this case includes two opposed bosses 56 and 58 which could be circular in cross-section but are most preferably of oval configuration, i.e., out of round to receive and support the ends of grab rail tubing sections 22 as shown in FIG. 1. The bosses are constructed and arranged to have a sliding fit within the ends of the tubing sections 22. If standard commercially available tubing is used by the installer, the ends of each tube section can be given an oval shape, e.g., by striking each end lightly with a hammer after being cut to size to fit the bosses 56 and 58. In this way the tubing sections 22 will be unable to rotate on the bosses 56 and 58 so as to provide firm, secure, and reliable support for a person using the grab railing 10.

The upper and lower halves 40 and 42 of the tubing support 30 are formed from a plastic resinous material of any suitable composition, e.g., polypropylene, nylon, PVC, polyester, polystyrene, Plexiglas, or other resin which has appealing visual qualities and is warm to the touch because of its relatively low thermal conductivity. The reinforcing plate 48 can be formed from any suitable material of high tensile strength such as steel.

The base 32 comprises a hollow body 60 formed from plastic resin with a horizontal mounting flange 62 at its lower end that is bored at 64 for mounting screws 67 used to attach the base 32 to a wall, floor, or other surface. Inside the plastic body 60 is a tubular or deep drawn metal reinforcing member 66 with an upper horizontal end wall 68 to which the nut 36 is bonded or welded, and a lower radially extending mounting flange 70 that has bored openings 72 which are aligned with the openings 64. After the screws 67 have been installed, an optional thin walled cover 74 formed from metal or plastic may be placed over the hollow plastic body 60 to hide the mounting screws 67. Cover 74 is held in place by the tubing support 30 which the installer attaches to the base 32 by bolt 34 after the cover 74 has been put in place as shown in FIG. 4. The upright base 32 serves as a pedestal for tubing support 30 which can rotate about the center of the bolt 34 so that it can be moved during installation to any desired angle for placing the grab railings in the position required by the specifications for that installation. Once the location of each base 32 is established, the mounting screws 67 can be placed in any convenient position because the bosses are not in place when the base is mounted. However, even if they were, the tubing support 30 is able to be turned in either direction to position the railings so that the screw holes will not be covered by the bosses 56, 58, thus facilitating installation.

Refer now to FIGS. 5-9 which illustrate the adjustable connector 20 in more detail. The base 32 which serves as a pedestal for the adjustable connector 20 is the same modular base 32 described above and shown in FIGS. 2-4. The same modular base 32 is used in all of the connectors to be described as a pedestal for rotatably supporting the tubing support at its upper end by means of the bolt 34 or other suitable fastener. The tubing support 30 of FIGS. 5-9 is also split longitudinally into upper and lower halves, which in this case are designated 80 and 82 at the left and 84 and 86 at the right with upper and lower halves 84 and 82 overlapping and in contact along a horizontal bearing surface 88 (FIG. 5) to define a joint for enabling the boss 80, 82 at the left to be pivoted with respect to a boss 84, 86 about a vertical axis 88 at the center of bolt 34 which acts as a pivot pin. In this case, a longitudinal recess 84a is provided in the lower surface of member 84 to accommodate a flat reinforcement plate 90 and the lower tubing support half 82 is provided with an upwardly opening recess 92 to receive a steel reinforcing plate 94 having a bored opening 96 aligned with a similar opening 98 in plate 90 for the bolt 34. Plate 90 overlaps plate 94 as best seen in FIG. 7. During installation, the base 32 is mounted first as described above in the correct position required for each particular railing installation. The tubing support 30 is then attached to base 32 by means of the bolt 34 which is secured to the nut 36 that is bonded or welded inside the base 32. Once the plates 90 and 94 have been positioned, the screws 50 can be screwed in place or, optionally, this can be done at the factory. The cap 54 is then placed over the bolt 34. The oval, i.e., out of round configuration of the boss 80, 82 is clearly shown in FIG. 7a. This feature prevents the tubing sections 22 from turning or rotating on the supporting bosses during use, thus providing secure support for the user.

Figure 11:
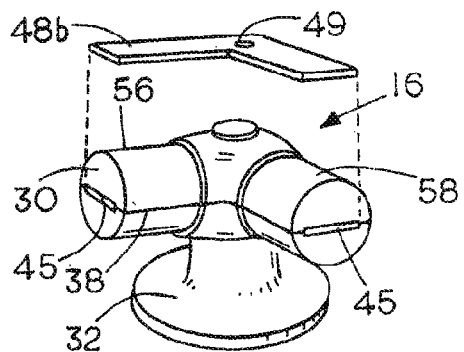
FIG. 11 is a perspective view of an L connector 16 of FIG. 1 in accordance with the invention showing its reinforcing plate in exploded position.
Figure 12:
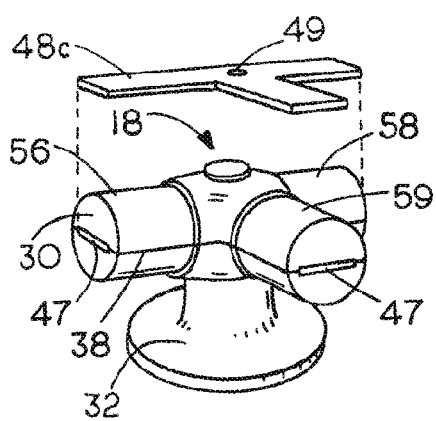
FIG. 12 is a perspective view of a T connector 18 in accordance with the invention showing its reinforcing plate in exploded position.
Figure 13:
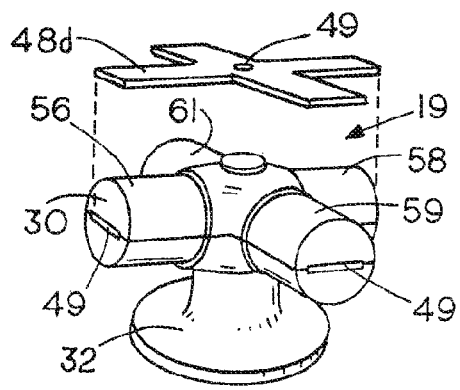
FIG. 13 is an X connector 19 in accordance with the invention showing its reinforcing plate in exploded position.

Refer now to FIGS. 10-13 which show, respectively, an end connector 12 with a single boss in FIG. 10, an L-shaped connector 16 in FIG. 11, a T connector 18 in FIG. 12, and an X connector 19 in FIG. 13; all with identical modular bases 32 that serve as a pedestal for holding the tubing support on a wall or other surface. In each of FIGS. 10-13, the tubing support is similar to that described in FIGS. 2-4 except that in FIG. 10 there is only one boss 56 and the metal reinforcing plate shown in an exploded view in FIG. 10 at 48a is of the appropriate length to fit between the halves of the end connector 12 which like connector 14 is split along longitudinal separation line 38 and includes a recess for plate 45a, the left end of which can be seen in FIG. 10. Like the metal reinforcing plate 48 in the support 12 of FIG. 3, the plate 48a which is recessed within support 30 at separation line 38 as in FIGS. 3 and 4 is bored at 49 to receive the bolt 34 (not shown in FIG. 10) the lower end of which is screw-threaded into the nut 36 of the base 32. The tubing supports 30 in all of FIGS. 10-13 are similarly constructed, the bolt 34 securing the tubing support assembly 30 to base 32 in each case as shown in FIGS. 3 and 4 so that it is free to rotate on the base 32 about the axis of the bolt 34.

In FIG. 11 the tubing support 16 is L-shaped as is the metal reinforcing plate 48b located at the separation line 38. In FIG. 12 the tubing support assembly 18 has a T-shaped configuration. The metal reinforcing plate 48c is similarly shaped to fit between the upper and lower halves of the support 30 which separate along longitudinally extending separation line 38. In FIG. 13, the tubing support assembly 19 has an X configuration, as does the metal reinforcing plate which is designated 48d. Each of the tubing support assemblies of FIGS. 11-13 are provided with recesses designated 45, 47, and 49, respectively, which are shaped in each case to receive the corresponding metal reinforcing plate shown and described. Thus in summary, the tubing support of FIGS. 2-4 has two aligned bosses 56, 58, the tubing support 30 of FIG. 10 has a single boss 56, the L-shaped tubing support 16 of FIG. 11 has a pair of bosses 56 and 58 that are at right angles to one another, the T-shaped support 18 of FIG. 12 has two aligned bosses 56 and 58 and an intermediate boss 59 at right angles thereto while the tubing support 19 of FIG. 13 has aligned bosses 56 and 58 similar to those described in FIG. 2-4 and another pair of bosses 59 and 61 at right angles to the first pair.

Figure 14:
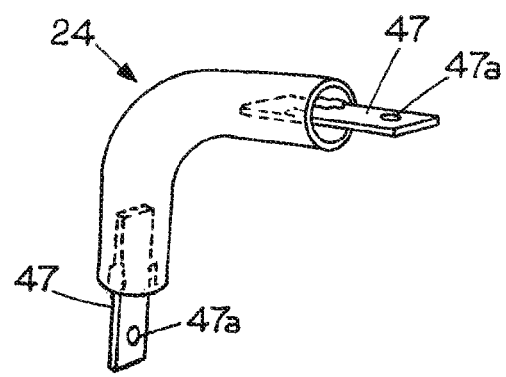
FIG. 14 is a tubular elbow railing section 24 in accordance with the invention.

Refer now to FIG. 14 which shows the section of tubing 24 of FIG. 1 with a right angle bend to provide an inside or outside elbow that can be connected between any of the tubing supports described. To provide the appropriate strength and to simplify installation, the elbow 24 is provided with a rectangular metal reinforcing plate 47 at each end similar to plate 48 that are positioned at right angles to one another and are normal to the plane of the elbow. Each of the reinforcing plates 47 is bonded, e.g., by spot welding or other suitable welding method to the interior surface of the elbow 24 and each is provided with a punched opening 47a that is appropriately positioned so that the bolt 34 can pass through it when the elbow is mounted on the boss of one of the tubing supports 30 of any of FIGS. 2-13. The location of the elbow 24 after being installed can be seen in FIG. 1. One of the bolts 34 shown in FIGS. 3 and 4 passes through each of the bored openings 47a to secure the elbow 24 in place between connectors 12 and 14 (FIG. 1).

In the event that one of the tubing supports such as 18 in FIG. 1 has bosses which do not require tubing sections 22, the bosses can be covered by end extensions 100 that are held in place in any suitable manner, e.g., by retaining screws extending the grip surface beyond the mounting base by about 4" per end. Tubing sections 22 can be made of metal or plastic and can be cut from any commercially available stock, thereby reducing installation and production costs.

Figure 15:
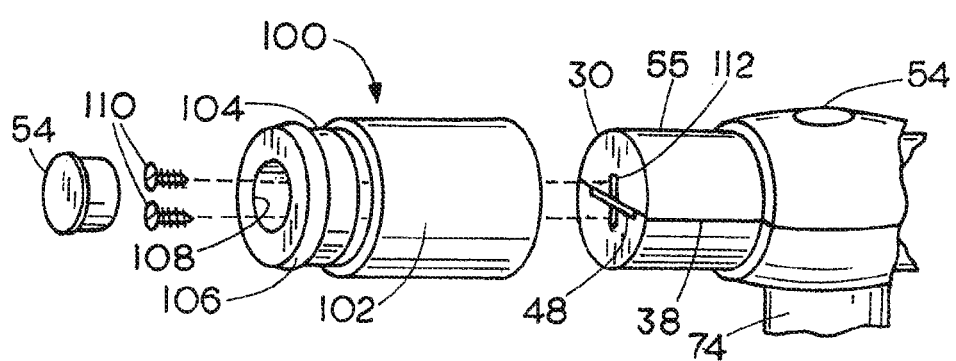
FIG. 15 is an exploded view showing an end cap extension.

The end extensions 100 will now be described in more detail in connection with FIG. 15 in which the same numerals refer to corresponding parts already described. First, a metal tube 102 that is typically 3" or 4" long is placed over the boss 30. A metal or plastic end cap 104 of cylindrical shape sized to fit into the open end of the tube 102 is inserted into the free end of the tube. The end cap 104 includes a circular rim or bead 106 near its outer end for limiting insertion of the end cap into the tube 102. In the center of the end cap 104 is a bore 108 which extends partially through the end cap 104 and includes openings for a pair of retaining screws 110 that are threaded into a slot 112 in the end of the boss 30. Once the screws 110 are in place, they are covered by a plug 54 which is the same plug 54 that is used at the center of each fitting. The plug is held by friction within the bore 108. The tubular extension 102 is properly dimensioned to fit over any of the bosses of any of the plastic fittings described herein above.

An important advantage of the invention is the variety of decorative possibilities provided by the plastic surfaces of the tubing support units 30, yet the invention has more than enough strength to meet code and industry requirements. The invention can be installed more easily than previously because the invention allows workmen to install the mounting screws 67 before attaching the tubing support 30 so that none of the screws or screw holes are located beneath or concealed by the ends of the tubing 22. Because the tubing support assembly is able to pivot about a vertical axis that is perpendicular to the wall or floor surface on which the connector is mounted at the center of bolt 34, minor angular adjustments in the grab tubing can easily be made if needed thereby facilitating the installation process. The invention is therefore appealing from an aesthetic viewpoint both visually and tactilely because when the connector assemblies and interconnected tubing sections are made of plastic resin, they will be warm to the touch while being rugged in construction, strong enough to meet all building codes, and can at the same time be installed with greater precision and less effort than prior tubular grab railings. Tubing sections 22 can be made of metal or plastic and can be cut from any commercially available stock, thereby reducing production costs.

In a modified form of the invention which is also contemplated, the separation line 38 is eliminated and the metal reinforcing plate 48 is molded in situ so that the upper and lower halves of the tubing support 30 are integral with one another. In that case, the plate 48 is positioned between upper and lower molding dies (not shown) prior to injecting plastic resin into the mold as will be understood by those skilled in the art.

Refer now to FIGS. 16-22 wherein the same numerals refer to corresponding parts previously described.

With particular reference to FIGS. 16, 16A and 17, the numeral 200 designates a reinforce connector assembly in accordance with another embodiment of the invention that includes a tubing support 202 which is attached to an upright base indicated generally at 204 (see FIG. 20) by means of a fastener 206 to be described more fully below. The tubing support 202 includes an upper portion 208 and a lower portion 210 that in the embodiment illustrated are separate components located on the upper and lower sides of a reinforcing member which can have any suitable shape, but which in this instance comprises an elongated reinforcing plate 212 extending substantially from one end 215 to the other end 216 of the reinforced connector assembly 200. In the form of the invention shown in the figures, the upper portion of the tubing support 202 comprises an upper half having a generally planar downwardly facing surface 220 including a downwardly opening recess 222 (FIG. 19). The lower portion comprises a lower half having an upper generally planar surface 224 with an upwardly opening recess 226 therein. Each recess has the same shape and dimensions as the reinforcing plate 212 so that the plate 212 fits securely therein as shown in FIGS. 17 and 19. Plate 212 is provided with apertures 212a and 212b to receive a second fastener means comprising a pair of screws 230 and 232 which pass through openings 208a and 208b (FIG. 16A) and are screw-threaded into the bottom portion 210 through threaded openings 210a and 210b to securely hold the reinforcing plate 212 between the upper and lower half of the tubing support 202 thereby forming a sandwiched structure comprising the upper half 208, the lower half 210 with the reinforcing plate 212 held between them by the second fastener means 230 and 232. As described hereinabove, the upper and lower portions 208 and 210 of the tubing support 202 can be formed from a suitable plastic resinous material such as polystyrene, polymethylmethacrylate or other resin and if desired can be solid structures as shown in FIG. 16A or if injection molded optionally hollow with anti-sink webbing (not shown) in the form of transverse or diagonal plastic plates extending centrally from the outer surface of each half in any suitable known arrangement.

In the same manner described hereinabove, the tubing support 202 includes at least one and in the case of FIGS. 16-17 a pair of bosses 211 and 213 each located at one end of the tubing support and dimensioned so that each boss is constructed and arranged to have a sliding fit within a separate section 22 of metal tubing that is not a part of the connector assembly 202 itself. Since most commercial steel tubing 22 has a longitudinal weld flash 22a that extends inwardly, each of the bosses 211, 213 is provided with a longitudinally extending groove 210e to accommodate the weld flash 22a. The rigid tubing 22 which can be obtained from any suitable commercially-available source is adapted to enclose each of the bosses 211 and 213 so as to thereby enclose and help confine the sandwiched structure formed by the upper and lower portions of the tubing support with the reinforcing plate 212 held securely between them. In this way, the reinforcing plate absorbs the bending moment due to forces applied by persons using the grab bar thereby preventing the portions 208 and 210 which can be plastic from bending, cracking or fracturing during use.

The lower half 210 of the tubing support includes a centrally located integral hollow cylindrical base cover 210c that extends downwardly from the lower portion 210 of the tubing support so as to fit concentrically around the base 204 as best seen in FIGS. 16 and 16A. Its lower end is in alignment with a confronting upper edge of a screw cover 207 which will be described more fully below.

Figure 20:
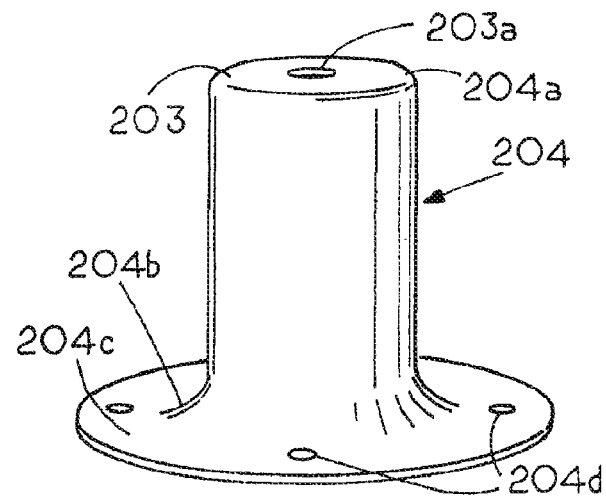
FIG. 20 is a perspective view of the deep drawn metal reinforcing member of the base shown in FIGS. 16, 16A and 21 that is used to secure the connector assembly of FIGS. 16-19 and 21 to a wall or floor.

The base 204 described with reference especially to FIG. 20 includes a tubular reinforcing member that can be formed from steel or brass or other suitable metal with upper and lower ends 204a and 204b and having a laterally extending flange 204c at its lower end. Flange 204c has a plurality of apertures 204d for the insertion of screw fasteners 205 to attach the reinforcing connector assembly 200 to a supporting surface such as a wall or a floor. After the screws 205 are in place, they are enclosed beneath an annular screw cover 207 with a decorative outer surface such as polished brass or chrome plating.

As best seen in FIGS. 16 and 16A, the tubing support 202 is attached to the base 204 by the fastener 206 which in this case comprises a bolt having a head at its upper end within a socket or opening 208c extending entirely through the upper portion of the tubing support between the bosses and covered by a security cap 209 which can have a decorative upper surface held frictionally in the socket 208c. In assembling the reinforced connector assembly 200, once the plate 212 is in place, the bolt 206 is inserted through a central aperture 212c (FIG. 17) in plate 212 and is passed through an aperture 203a in a horizontal upper wall 203 of the base 204. After adjusting the position of the tubing support 202 by pivoting the tubing support about the central vertical axis of the fastener 206 as required, the aperture 212c which can be threaded or a nut 206a placed on the fastener is tightened to securely lock the tubing support in the desired position about the axis of the fastener 206 to line it up with the other parts of the complete railing. A passage 210d in the lower half of the tubing support extends all the way through to its upper surface to provide an opening (FIG. 16A) so that the top wall 203 of the base can be located coplanar with the surface of recess 226 (FIG. 19) enabling the top wall 203 of the base to be positioned in direct face-to-face contact with the reinforcing plate 212 to assure that the metal reinforcing elements are touching one another.

In this way, the fastener 206 is able to maintain a secure metal-to-metal connection between the tubing support 202 and the base 204 by fastening the reinforcing plate 212 directly to the top wall 203 of the base 204 to reduce or eliminate stresses otherwise placed on the plastic resin from which the tubing support 202 is formed.

The reinforcing plate 212 will now be described more fully with reference to FIGS. 16, 16A, 17 and 19. It can be seen in FIGS. 16 and 16A that the recesses 222 and 226 (FIG. 19) are provided on each side with laterally disposed ports 250 and 252 that open out through the sidewall near each end of the tubing support and communicate interiorly with the recesses 222 and 226. The reinforcing plate 212 has a pair of laterally extending ears 212d at one end and 212e at the other end, each ear being positioned to extend out through one of the ports 250, 252 by a distance that can typically be about 0.020 inch (0.079 mm). In this way the ears project outwardly beyond the outer surface of the boss so as to engage and expand the overlying tubing section 22 as shown best in FIG. 19. In this way the ears distort the tubing section 22 slightly and provide enough frictional engagement to prevent the tubing section from rotating on the boss over which it is placed. While the bosses can be oval in cross section, they can also be round. Likewise, each tubing section can be round in cross-section and does not have to be specially formed before being mounted since it will assume an oval shape as seen in cross-section as it is slid into place (FIG. 17) with the ears 212d and 212e distending and preventing rotation of the tube. It will be seen that the ears 212d and 212e comprise laterally aligned wing-like projections that are coplanar with the reinforcing plate 212 on opposite side edges of the plate. As best seen in FIG. 17, the ears have outer edges for engagement with the tubing that include portions 260 which taper inwardly proceeding toward each end of the tubing support and terminate in a flat section 262 at the centermost end of each ear with parallel tube-engaging surfaces 262 that scrape against the inner surface and distend the tubing section that is placed on each boss.

Figure 21:
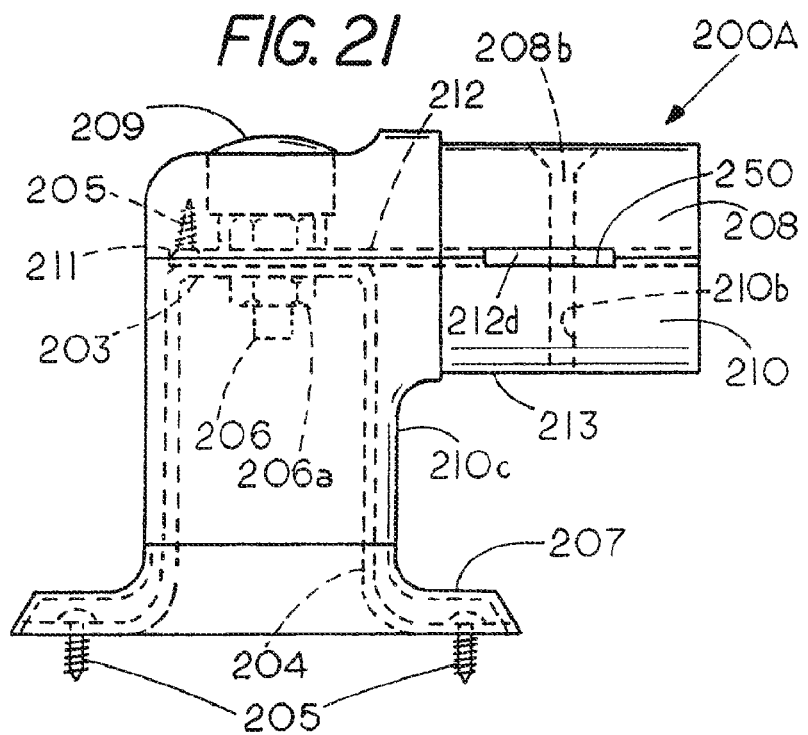
FIG. 21 is a side elevational view of an end fitting connector similar to that shown in FIG. 10 but embodying the mechanical construction shown in FIGS. 16 and 16A.

Refer now to FIG. 21 which shows a side elevational view of an end fitting connector 200A with mechanical features that are similar to FIGS. 16-20 but having only one boss 213 like that of FIG. 10 which is used to secure the endmost railing section to a supporting surface such as the wall of a building. The same numerals refer to corresponding parts already described, In the end connector 200A, the reinforcing plate 212 terminates at 211 since only one boss 203 is needed. To securely hold the plate 212 in place at its inner end, a retaining screw 205 is preferably passed through an opening in the plate and screwed into the upper portion 208 of the connector assembly as shown in FIG. 21 to provide a secure attachment. Stresses applied to a tubing section 22 placed on the boss 213 are transferred through the upper and lower plastic portions of the tubing support to the plate 212 which in turn transmits the applied force through the base 204 to the wall or other supporting surface thereby virtually eliminating stress on the plastic components. Rotation of the overlying tubing 22 is prevented by the engaged ears as described above.

Many variations of the present invention within the scope of the appended claims will be apparent to those skilled in the art once the principles described herein are understood.

What is claimed is:

1. A reinforced connector assembly for a tubular grab railing comprising:
   a tubing support for engaging and supporting a tubular grab railing that extends parallel to a wall or a floor surface and said tubing support includes an upper portion and a lower portion with a longitudinally extending recess therebetween,
   an elongated reinforcing plate extending through the recess from substantially one end of the tubing support to the other between the upper and lower portions of the tubing support as a part of a sandwich structure formed by upper and lower portions and the enclosed reinforcing plate therebetween;
   the tubing support including a pair of bosses, each comprising one end of the sandwich structure, one such boss being located at a first end of the tubing support and the other boss being located at a second end of the tubing support;
   each such boss being constructed and arranged to have a sliding fit within a respective separate tubing section of a tubular grab railing such that the tubing section is adapted to longitudinally receive and enclose each such boss to thereby surround the sandwich structure formed by the upper and lower portions of the tubing support and the reinforcing plate therein;
   a central part of the tubing support between said plurality of bosses is exposed to view when a tubing section of the tubular grab railing is fitted in place over each boss;
   a hollow cylindrical cover extending downwardly from the central part of the lower portion of the tubing support;
   a base comprising a tubular reinforcing member with upper and lower ends, said base having a horizontally disposed top wall at the upper end and a laterally extending flange at the lower end thereof to attach the reinforced connector assembly to a support surface;
   a fastener inserted through the upper and lower portions of the tubing support through the reinforcing plate and into the top wall of the base to secure the base to the tubing support and to enable the tubing support to be pivoted on the base during installation; and
   the hollow cylindrical cover that extends from the tubing support enclosing and protecting the base by being mounted concentrically thereon.

2. The reinforced connector assembly of claim 1 wherein the tubing support is formed from a plastic resinous material and the reinforcing plate comprises a metal plate for reinforcing the plastic resinous material of the tubing support from substantially one end thereof to the other end.

3. The reinforced connector assembly of claim 1 wherein the upper and lower portions of the tubing support are formed from a pair of separate support members including an upper half having a generally planar downwardly facing surface with a downwardly opening recess therein and the lower portion of the tubing support comprises a lower half thereof having an upper generally planar surface with an upwardly opening recess therein confronting the downwardly opening recess and the reinforcing plate as located within the recesses.

4. The tubing support of claim 3 wherein the upper and lower halves of the tubing support are joined together by a second fastener means located within at least one boss and the second fastener means is secured between upper and lower halves of the tubing support.

5. The reinforced connector assembly of claim 1 wherein the fastener is a bolt, the bolt has one end located in a socket in the upper portion of the tubing support and the bolt extends through the reinforcing plate and the base for securing the reinforcing plate directly to the base such that adjacent surfaces thereof are in face-to-face contact with one another.

6. The reinforced connector assembly of claim 1 wherein the bosses are in alignment or at right angles to one another.

7. The reinforced connector assembly of claim 1 wherein the longitudinally extending recess in the tubing support has a pair of laterally extending outwardly opening ports therein and the reinforcing plate has at least a pair of laterally extending ears thereon that project through the ports so as to project outwardly beyond an outer surface of the tubing support to engage and expand the tubular railing section mounted thereon, thereby distorting the tubing section to prevent the tubular railing section from rotating on the boss therein.

8. The reinforced connector assembly of claim 7 wherein the ears expand and score the inside surface of the tubing section to thereby hold the tubing section in place by preventing the tubing section from rotating on the underlying boss.

9. The reinforced connector assembly of claim 7 wherein the ears comprise laterally extending opposed projections that are coplanar with the reinforcing plate and are in lateral alignment on opposite sides of the plate.

10. The reinforced connector assembly of claim 7 wherein the ears have an outer edge for engagement with the tubular railing section that includes a portion which is tapered inwardly proceeding toward each end of the tubing support and terminate in a flat section at a central end of each ear with parallel tube-engaging surfaces that scrape against an inner surface of the tubular railing section that is slid thereon.

11. The reinforced connector assembly of claim 1 wherein each boss has at least one outward projection constructed and arranged to engage and distort the cross-section of the tubular railing whereby the tubular railing section enclosing each such boss cannot be rotated on the boss which it encloses.

12. The reinforced connector assembly of claim 1 wherein each boss has a selected diameter of the central part and an adjacent diameter of the tubing support between the bosses is greater than the diameter of each boss.

13. The reinforced connector assembly of claim 1 wherein the reinforcing member is molded in situ in the tubing support.

14. The reinforced connector assembly of claim 1 including an annular screw cover with an upper circular end confronting a lower end of the hollow cylindrical cover.

15. A reinforced connector assembly for a tubular grab railing comprising:
 a tubing support for engaging and supporting a tubing section of a tubular grab railing that extends parallel to a wall or a floor surface, said tubing support including an upper portion and a lower portion with a longitudinally extending recess therebetween,
 an elongated reinforcing plate extending through the recess substantially between the ends of the tubing support intermediate the upper and lower portions of the tubing support as a part of a sandwich structure;
 the tubing support including a boss located at a first end and a second end of the tubing support with the reinforcing plate extending therethrough proximate an opposite end of the tubing support;
 each boss being constructed and arranged to have a sliding fit longitudinally within a respective separate tubing section of the tubular grab railing such that the tubing section is adapted to enclose the boss to thereby confine the sandwich structure formed by the upper and lower portions of the tubing support with the reinforcing plate therebetween;
 a central part of the tubing support disposed centrally between the bosses being exposed to view when the tubing sections of the tubular grab railing are fitted upon the boss;
 a base comprising a tubular reinforcing member with upper and lower ends, said base having a horizontally disposed top wall at the upper end and a laterally extending flange at the lower end thereof to attach the reinforcing connector assembly to a support surface;
 a fastener inserted through the upper and lower portions of the tubing support through the reinforcing plate and into the top wall of the base to secure the base to the tubing support; and
 the reinforcing plate being secured in face-to-face contact with the top wall of the base.

16. The reinforced connector assembly of claim 15 wherein the reinforcing plate has laterally projecting ears that extend outwardly beyond outside surfaces of the boss into engagement with a section of the tubular railing to prevent rotation thereof on the boss.

17. The reinforced connector assembly of claim 16 wherein the ears comprise laterally extending opposed projections that are coplanar with the reinforcing plate and are in lateral alignment on opposite sides of the reinforcing plate.

18. The reinforced connector assembly of claim 16 wherein the ears have an outer edge for engagement with the tubing that includes a portion which is tapered inwardly proceeding toward an end of the tubing support and terminating in a flat section that has parallel tube-engaging surfaces that scrape against an inner surface of the tubing section which is slid thereon.

19. The reinforced connector assembly of claim 15 wherein the tubing support is formed from a plastic resinous material and the reinforcing plate comprises a metal plate for reinforcing the plastic resinous material of the tubing support from substantially one end to the other to help prevent the plastic resin from fracturing or breaking when a force is applied thereto during use.

20. The reinforced connector assembly of claim 15 wherein the upper and lower portions of the tubing support are formed from a pair of separate support members including an upper half having a generally planar downwardly facing surface with a downwardly opening recess therein and the lower portion of the tubing support comprises a lower half thereof having an upper generally planar surface with an upwardly opening recess therein confronting the downwardly opening recess and the reinforcing plate is located within the recesses.

21. The reinforced connector assembly of claim 15 wherein the fastener is a bolt, the bolt has one end located in a socket in the upper portion of the tubing support and the bolt extends through the reinforcing plate and the base for securing the reinforcing plate directly to the base such that adjacent surfaces thereof are forced into contact with one another by a threaded aperture in the base or a nut adapted to be screwed onto the bolt.

22. The reinforced connector assembly of claim 15 wherein the reinforcing member is molded in situ in the tubing support.

\* \* \* \* \*